US012695921B2

(12) United States Patent
Mukherjee

(10) Patent No.: US 12,695,921 B2
(45) Date of Patent: *Jul. 28, 2026

(54) RESTORATION FOR VIDEO CODING WITH SELF-GUIDED FILTERING AND SUBSPACE PROJECTION

(71) Applicant: GOOGLE LLC, Mountain View, CA (US)

(72) Inventor: Debargha Mukherjee, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/070,658

(22) Filed: Mar. 5, 2025

(65) Prior Publication Data

US 2025/0203121 A1 Jun. 19, 2025

Related U.S. Application Data

(63) Continuation of application No. 18/437,402, filed on Feb. 9, 2024, now Pat. No. 12,262,065, which is a
(Continued)

(51) Int. Cl.
*H04N 19/86* (2014.01)
*G06T 5/70* (2024.01)
(Continued)

(52) U.S. Cl.
CPC .............. *H04N 19/865* (2014.11); *G06T 5/70* (2024.01); *H04N 19/117* (2014.11);
(Continued)

(58) Field of Classification Search
CPC .... H04N 19/865; H04N 19/182; H04N 19/86; H04N 19/46; H04N 19/80; H04N 19/174;
(Continued)

(56) References Cited

U.S. PATENT DOCUMENTS

2004/0131273 A1* 7/2004 Johnson ................... G06T 5/94
382/254
2005/0129320 A1* 6/2005 Koto ................... H04N 19/103
375/E7.146
(Continued)

FOREIGN PATENT DOCUMENTS

CN      102609905 A      7/2012
CN      103440630 A      12/2013
(Continued)

OTHER PUBLICATIONS

Bankoski et al., "VP8 Data Format and Decoding Guide", Independent Submission RFC 6389, Nov. 2011, 305 pp.
(Continued)

*Primary Examiner* — Richard T Torrente
(74) *Attorney, Agent, or Firm* — Young Basile Hanlon & MacFarlane P.C.

(57) ABSTRACT

A non-transitory computer-readable storage medium having stored thereon an encoded bitstream includes at least one first syntax element indicative of first restoration parameters for generating a first guide frame $Y_1$ for a degraded frame Y and second restoration parameters for generating a second guide frame $Y_2$ for the degraded frame Y, and at least one second syntax element indicative of a first projection parameter $\alpha$ and a second projection parameter $\beta$. The first projection parameter $\alpha$ and the second projection parameter $\beta$ are used in a projection operation to restore the degraded frame Y, and the projection operation is based on $\alpha(Y_1 - Y) + \beta(Y_2 - Y)$ to generate a reconstructed frame $Y_R$.

15 Claims, 9 Drawing Sheets

Related U.S. Application Data continuation of application No. 17/866,631, filed on Jul. 18, 2022, now Pat. No. 11,924,476, which is a continuation of application No. 16/666,676, filed on Oct. 29, 2019, now Pat. No. 11,405,653, which is a continuation of application No. 15/719,918, filed on Sep. 29, 2017, now Pat. No. 10,477,251.

(60) Provisional application No. 62/417,545, filed on Nov. 4, 2016.

(51) Int. Cl.

| | |
|---|---|
| *H04N 19/117* | (2014.01) |
| *H04N 19/136* | (2014.01) |
| *H04N 19/174* | (2014.01) |
| *H04N 19/176* | (2014.01) |
| *H04N 19/182* | (2014.01) |
| *H04N 19/192* | (2014.01) |
| *H04N 19/46* | (2014.01) |
| *H04N 19/80* | (2014.01) |
| *H04N 19/85* | (2014.01) |
| H04N 19/463 | (2014.01) |

(52) U.S. Cl.
CPC ......... *H04N 19/136* (2014.11); *H04N 19/174* (2014.11); *H04N 19/176* (2014.11); *H04N 19/182* (2014.11); *H04N 19/192* (2014.11); *H04N 19/46* (2014.11); *H04N 19/80* (2014.11); *H04N 19/85* (2014.11); *H04N 19/86* (2014.11); *G06T 2207/20021* (2013.01); *G06T 2207/20192* (2013.01); *H04N 19/463* (2014.11)

(58) Field of Classification Search
CPC .... H04N 19/85; H04N 19/192; H04N 19/117; H04N 19/136; H04N 19/176; H04N 19/463; G06T 5/002; G06T 2207/20192; G06T 2207/20021
See application file for complete search history.

(56) References Cited

U.S. PATENT DOCUMENTS

| | | | | |
|---|---|---|---|---|
| 2006/0050786 | A1* | 3/2006 | Tanizawa | H04N 19/176 |
| | | | | 375/E7.181 |
| 2009/0161768 | A1* | 6/2009 | Park | H04N 19/117 |
| | | | | 375/E7.029 |
| 2009/0167775 | A1* | 7/2009 | Lu | G06F 3/14 |
| | | | | 345/547 |
| 2010/0254448 | A1* | 10/2010 | Xu | H04N 19/91 |
| | | | | 375/E7.076 |
| 2014/0193093 | A1* | 7/2014 | Rao | G06T 5/94 |
| | | | | 382/261 |
| 2014/0285623 | A1* | 9/2014 | Bruls | H04N 13/128 |
| | | | | 348/43 |
| 2014/0285719 | A1* | 9/2014 | Gong | G06T 5/73 |
| | | | | 348/606 |
| 2015/0016720 | A1* | 1/2015 | Vermeir | H04N 19/117 |
| | | | | 382/167 |
| 2015/0189329 | A1* | 7/2015 | Wada | H04N 19/59 |
| | | | | 382/199 |
| 2015/0271488 | A1* | 9/2015 | Gu | H04N 19/119 |
| | | | | 375/240.16 |
| 2016/0212436 | A1* | 7/2016 | Laude | H04N 19/33 |
| 2016/0232426 | A1* | 8/2016 | Wang | G06T 5/50 |
| 2018/0192068 | A1 | 7/2018 | Nam et al. | |

FOREIGN PATENT DOCUMENTS

| | | |
|---|---|---|
| CN | 103828366 A | 5/2014 |
| CN | 105191277 A | 12/2015 |

OTHER PUBLICATIONS

Bankoski et al., "VP8 Data Format and Decoding Guide draft-bankoski-vp8-bitstream-02", Network Working Group, Internet-Draft, May 18, 2011, 288 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
Bankoski, et al., "Technical Overview of VP8, An Open Source Video Codec for the Web", Jul. 11, 2011, 6 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
"VP8 Data Format and Decoding Guide, WebM Project", Google On2, Dec. 1, 2010, 103 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
He, et al., Guided Image Filtering, Computer Vision-ECCV 2010, Springer Berlin Heidelberg 2010, pp. 1-14.
Chen et al., Adaptive Guided Image Filter for Improved In-loop Filtering in Video Coding, 2015 IEEE 17th International Workship on Multimedia Signal Processing , IEEE, Oct. 19, 2015, pp. 1-6.
International Search Report and Written Opinion in PCT/US2017/054354, mailed Dec. 21, 2017.

\* cited by examiner

600

602

GENERATE, USING FIRST RESTORATION PARAMETERS, A FIRST GUIDE TILE FOR A DEGRADED TILE

604

DETERMINE A PROJECTION PARAMETER FOR A PROJECTION OPERATION THAT RELATES TILE DIFFERENCES

606

ENCODE THE FIRST RESTORATION PARAMETERS AND THE PROJECTION PARAMETER IN AN ENCODED BITSTREAM

1000

1002
DETERMINE PROJECTION PARAMETERS

1004
DETERMINE RESTORATION PARAMETERS

1006
GENERATE GUIDE TILES FOR A DEGRADED TILE

1008
PERFORM A PROJECTION OPERATION

RESTORATION FOR VIDEO CODING WITH SELF-GUIDED FILTERING AND SUBSPACE PROJECTION

CROSS-REFERENCE TO RELATED APPLICATIONS

This application is a continuation of U.S. patent application Ser. No. 18/437,402, filed on Feb. 9, 2024, which is a continuation of U.S. patent application Ser. No. 17/866,631, filed on Jul. 18, 2022, which is a continuation of U.S. patent application Ser. No. 16/666,676, filed on Oct. 29, 2019, which is a continuation of U.S. patent application Ser. No. 15/719,918, filed on Sep. 29, 2017, which claims the benefit of U.S. Provisional Patent Application Ser. No. 62/417,545, filed on Nov. 4, 2016, the entire disclosures of which are hereby incorporated by reference.

BACKGROUND

Digital video streams can represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

Encoding using compression can be performed by breaking frames or images into blocks that are then compressed, often using encoding techniques that result in loss of some data. A decoder can apply one or more filters to a reconstructed frame in order to remove or smooth out artifacts caused by (e.g., lossy) encoding.

SUMMARY

The disclosure relates in general to video coding, and in particular to restoration using filtering and subspace projection.

A first aspect is a non-transitory computer-readable storage medium having stored thereon an encoded bitstream that includes at least one first syntax element indicative of first restoration parameters for generating a first guide frame Y1 for a degraded frame Y and second restoration parameters for generating a second guide frame Y2 for the degraded frame Y; and at least one second syntax element indicative of a first projection parameter $\alpha$ and a second projection parameter $\beta$. The first projection parameter $\alpha$ and the second projection parameter $\beta$ are used in a projection operation to restore the degraded frame Y, and the projection operation is based on $\alpha(Y1-Y)+\beta(Y2-Y)$ to generate a reconstructed frame YR.

A second aspect is a non-transitory computer-readable storage medium having stored thereon an encoded bitstream that includes an index into a codebook containing predefined sets of restoration parameters, the index corresponding to first restoration parameters for generating a first guide frame Y1 and second restoration parameters for generating a second guide frame Y2 for a degraded frame Y; and a first projection parameter $\alpha$ and a second projection parameter $\beta$ for use in a projection operation to generate a reconstructed frame YR. The projection operation is based on $\alpha(Y1-Y)+$ $\beta(Y2-Y)$, and the encoded bitstream is configured for decoding by operations that include restoring the degraded frame Y using the first guide frame Y1, the second guide frame Y2, and the projection operation.

A third aspect is a non-transitory computer-readable storage medium having stored thereon an encoded bitstream that includes a frame header including syntax elements for decoding a first projection parameter $\alpha$ and a second projection parameter $\beta$, where the first projection parameter $\alpha$ and the second projection parameter $\beta$ are used in a projection operation based on $\alpha(Y_1-Y)+\beta(Y_2-Y)$ to restore a degraded frame Y, where $Y_1$ is a first guide frame generated using first restoration parameters, and where $Y_2$ is a second guide frame generated using second restoration parameters; and the first restoration parameters and the second restoration parameters for generating the first guide frame and the second guide frame, respectively.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views.

DETAILED DESCRIPTION

Figure 1:
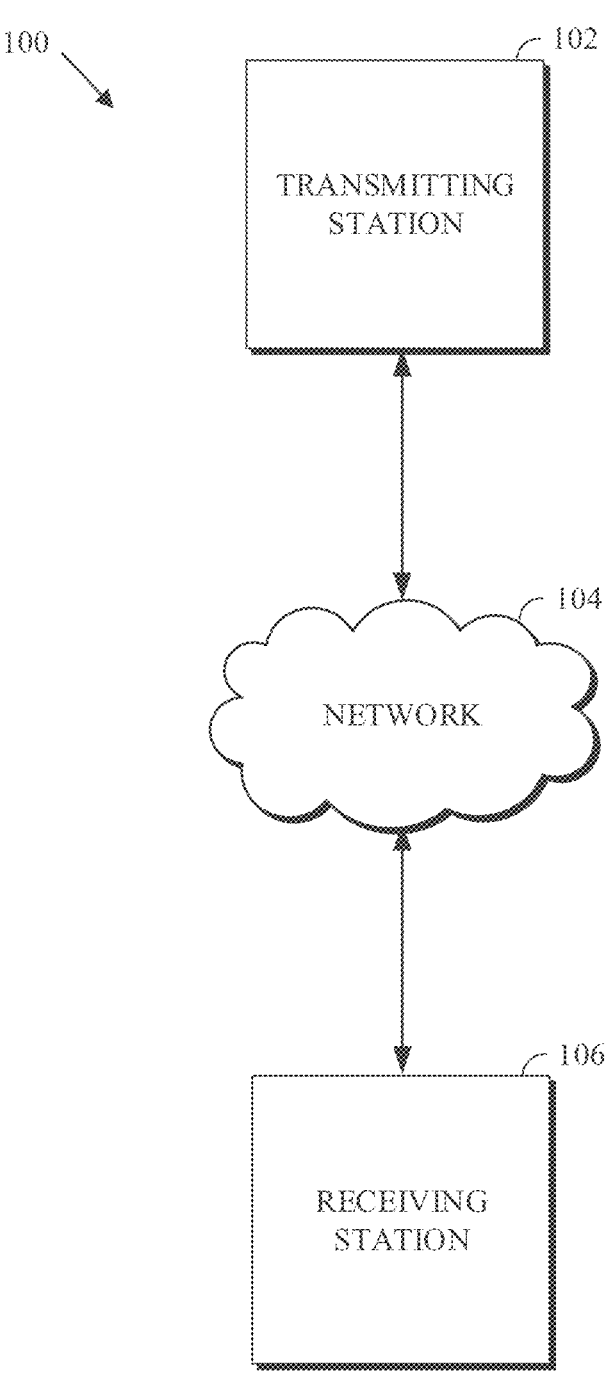
FIG. 1 is a schematic of a video encoding and decoding system.

As mentioned above, compression schemes related to coding video streams can include breaking images into blocks and generating a digital video output bitstream using one or more techniques to limit the information included in the output. A received bitstream can be decoded to re-create the blocks and the source images from the limited information. Encoding a video stream, or a portion thereof, such as a frame or a block, can include using temporal or spatial similarities in the video stream to improve coding efficiency. For example, a current block of a video stream can be encoded based on identifying a difference (residual) between previously coded pixel values and those in the current block.

In this way, only the residual and/or parameters used to generate the residual need be added to the bitstream instead of including the entirety of the current block. The residual can be encoded using a lossy quantization step. Decoding (i.e., reconstructing) an encoded block from such a residual often results in a distortion between the original (i.e., source) block and the reconstructed block.

Post-reconstruction loop filters can be used in various ways to improve reconstructed frames distorted or degraded as a result of the encoding and decoding processes. For example, in-loop deblocking filters can be used to modify pixel values near borders between blocks to limit the visibility of those borders within the reconstructed frame. Other loop filters can be used to bring the reconstructed images closer to the source images by, for example, adding offsets that are determined at the encoder to pixel values of the reconstructed frame. Those loop filters operate in a blind setting (i.e., without access to both a source frame and its associated reconstructed frame).

According to the teachings herein, access to both the source and reconstructed frames at the encoder can make it possible to send information from the encoder that guides the decoder into achieving superior restoration. Among other things, restoration in video coding using filtering and subspace projection is described. A guided filter uses a frame to be filtered and a guide image (e.g., a guide tile) of at least a portion of a frame. Making the guide image and the frame portion perceptually the same (e.g., reducing their differences to close to zero) results in an edge-preserved, de-noised image. That is, the resulting image is smoothed where there are no edges, and edges are preserved (i.e., the edges are not smoothed). Restoration parameters for a projection formula based on the frame differences can be encoded and signaled to the decoder. The restoration described herein can be implemented in a switchable restoration framework, which refers to the ability to switch between (e.g., use) different restoration techniques or types for different portions of a reconstructed frame. Various systematic errors (such as DC shifts in flat regions of frames), or color bias, can be removed or at least partially compensated so the restored image can be brought closer to the source image.

Restoration using filtering and subspace projection is described herein first with reference to a system in which the teachings can be incorporated. As alluded to above, in the restoration herein, the frame can be restored in one or more portions. Each of these portions is referred to herein respectively as a "tile," where tiles may or may not overlap each other.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
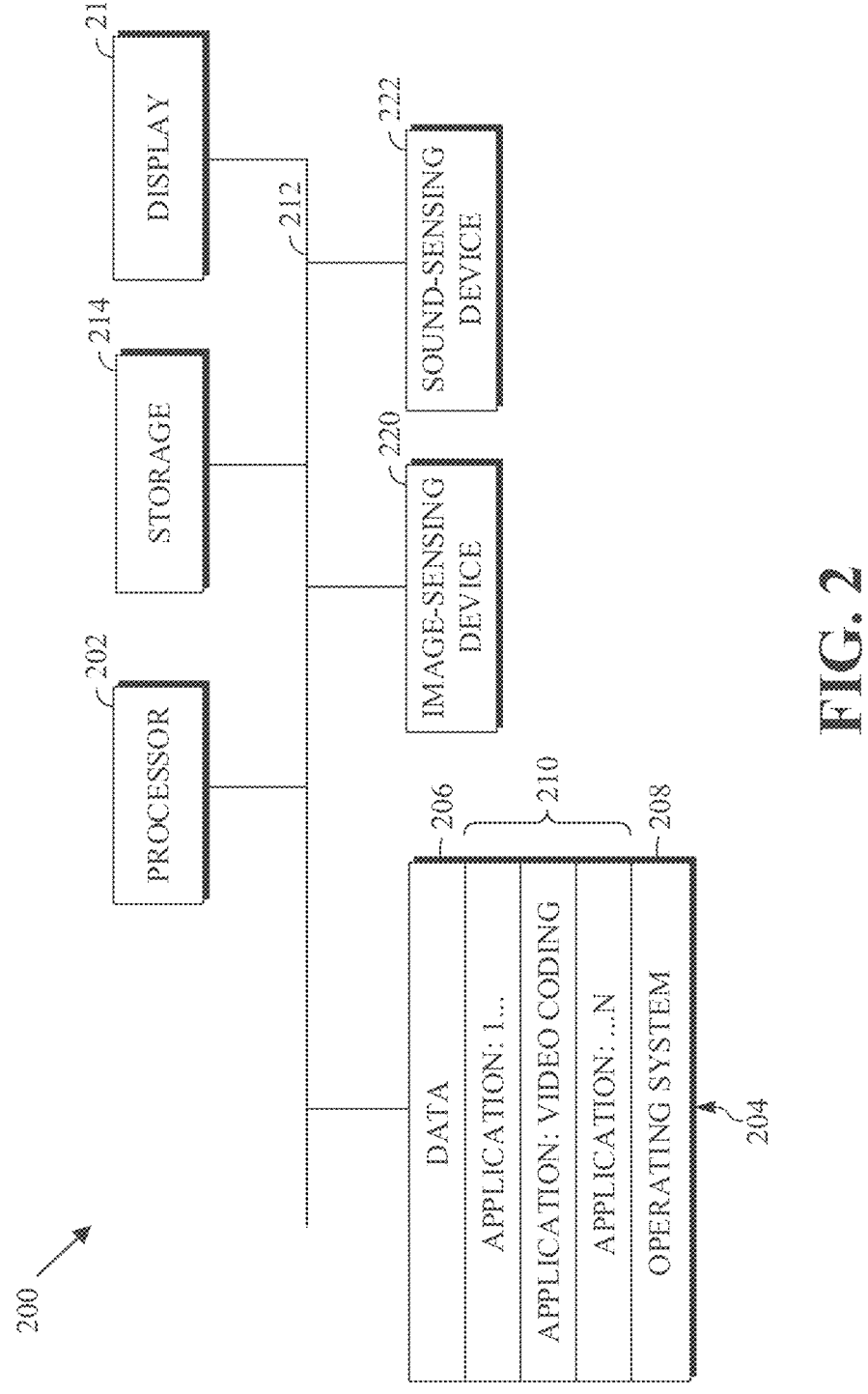
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP can be used, e.g., an HTTP-based video streaming protocol.

When used in a video conferencing system, for example, the transmitting station 102 and/or the receiving station 106 can include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit.

Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions can contain a significant amount of information, they can be stored in whole or in part in the secondary storage 214 and loaded into the memory 204 as needed for processing.

The computing device 200 can also include one or more output devices, such as a display 218. The display 218 can be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
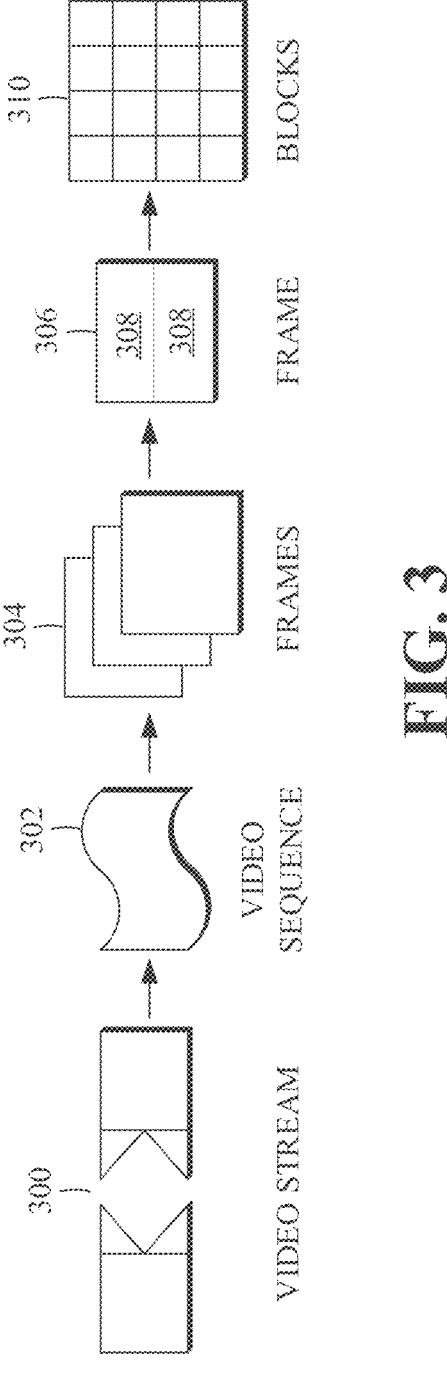
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 can be sampled at different resolutions.

Whether or not the frame 306 is divided into the segments 308, the frame 306 can be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels or larger.

Figure 4:
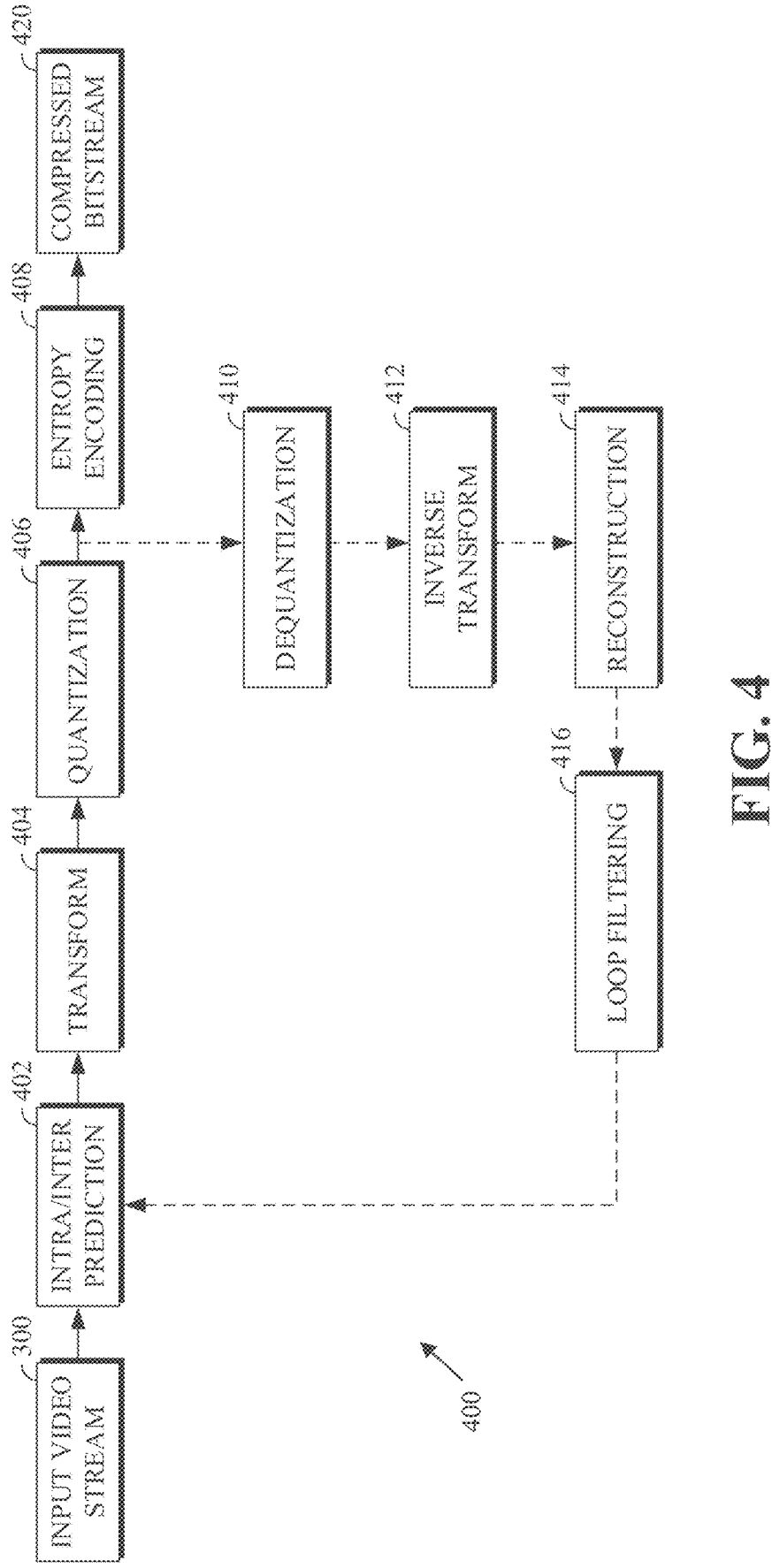
FIG. 4 is a block diagram of an encoder according to implementations of this disclosure.

FIG. 4 is a block diagram of an encoder 400 in accordance with implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 can also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination both. In any case, a prediction block can be formed. In the case of intra-prediction, all or a part of a prediction block can be formed from samples in the current frame that have been previously encoded and reconstructed. In the case of inter-prediction, all or part of a prediction block can be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms can be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, can be different from the size of the transform block. For example, the prediction block can be split into smaller blocks to which separate transforms are applied.

The quantization stage 406 converts the transform coefficients into discrete quantum values, which are referred to as quantized transform coefficients, using a quantizer value or a quantization level. For example, the transform coefficients can be divided by the quantizer value and truncated. The quantized transform coefficients are then entropy encoded by the entropy encoding stage 408. Entropy coding can be performed using any number of techniques, including token and binary trees. The entropy-encoded coefficients, together with other information used to decode the block, which can include for example the type of prediction used, transform type, motion vectors and quantizer value, are then output to the compressed bitstream 420. The information to decode the block can be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
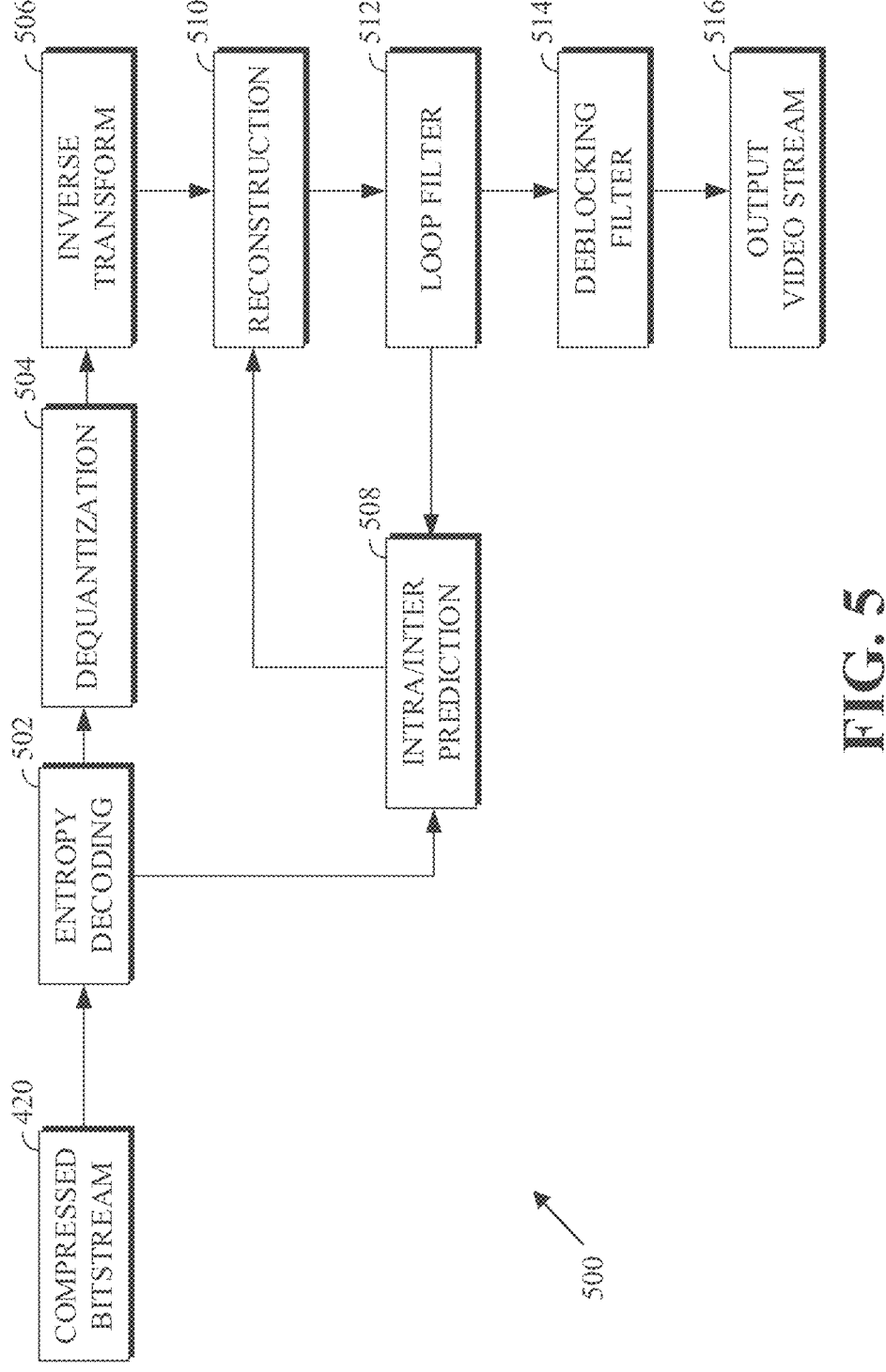
FIG. 5 is a block diagram of a decoder according to implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 10 below. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In an example, the deblocking filtering stage 514 is applied to the reconstructed block to reduce blocking distortion as described below, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the deblocking filtering stage 514. In some implementations of the decoder 500, the deblocking filtering stage 514 is applied before the loop filtering stage 512. Additionally, or alternatively, the encoder 400 includes a deblocking filtering stage in addition to the loop filtering stage 416.

Figure 6:
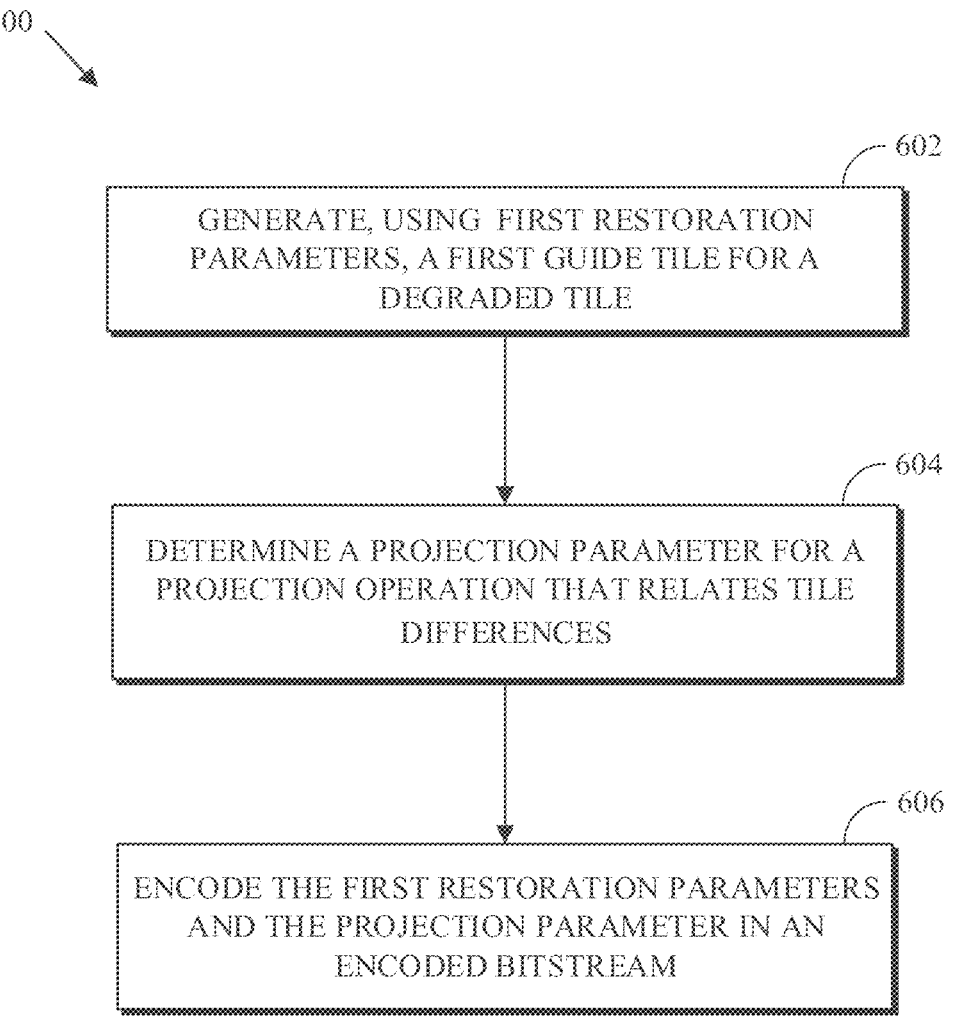
FIG. 6 is a flowchart diagram of a process for restoring a degraded frame at an encoder according to an implementation of this disclosure.

FIG. 6 is a flowchart diagram of a process 600 for restoring a degraded frame at an encoder according to an implementation of this disclosure. The process 600 can be implemented in an encoder such as the encoder 400 and can be implemented, for example, as a software program that can be executed by computing devices such as transmitting station 102. The software program can include machine-readable instructions that can be stored in a memory such as the memory 204 or the secondary storage 214, and that can be executed by a processor, such as CPU 202, to cause the computing device to perform the process 600. In at least some implementations, the process 600 can be performed in whole or in part by the loop filtering stage 416 of the encoder 400.

The process 600 can be implemented using specialized hardware or firmware. Some computing devices can have multiple memories, multiple processors, or both. The steps or operations of the process 600 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

The process 600 initially receives a degraded tile of a source frame. The degraded tile can be, for example, all or a portion of a reconstructed frame from a reconstruction loop of an encoder. Herein, the reconstructed frame is referred to as a degraded frame so as to distinguish it from the final reconstructed frame after filtering. The final reconstructed frame is referred to herein as a restored frame. For example, all or a portion of the degraded frame could be received from the reconstruction stage 414 at the loop filtering stage 416 of the encoder 400. The degraded frame can be deblocked before the process 600 occurs.

In an example, the process 600 can receive the entire degraded frame and partition the frame into one or more degraded tiles. That is, the process 600 can partition a degraded frame into one or more tiles. Alternatively, the process 600 can receive degraded tiles as partitioned at a previous stage of an encoder or decoder. That is, the process 600 can process whatever unit of a frame (whether a tile or the frame itself) that the process 600 receives.

The size of each tile can be selected based on a tradeoff between localization of the statistical properties of the degraded frame and the number of bits to be used in the encoded bitstream. For example, if a smaller tile size is selected, better localization can be achieved; however, a higher number of bits will be used for encoding the degraded frame. Alternatively, tile sizes can be selected independent of statistical properties of the frame, such as by reference to the degraded frame size. For example, if the frame size is greater than 256×256 pixels, the tile size can be set to 256×256 pixels; otherwise, the tile size is set to 120×120 pixels. The tile size can be selected based on the frame size exceeding a threshold value. The tile size can be set to the size of the frame such that the frame includes only one tile. Other ways of selecting tile sizes can be used with implementations of this disclosure.

At 602, a guide tile (i.e., a first guide tile) is generated for a degraded tile. More than one guide tile can be used for restoration of a degraded tile. The guide tile can be referred to as a cheap restored version of the degraded tile as it is desirably generated using computations with relatively low complexity. For example, a guide tile can be generated for pixel locations within the guide tile by filtering or smoothing original pixel values at the respective locations using adjacent pixel values. An original pixel value refers to a pixel value of the co-located pixel of the source frame. The guide tile can be generated using restoration parameters (i.e., first restoration parameters). When multiple guide tiles are used for restoration, they can be generated using different parameters for the filtering or smoothing in the same technique. For example, a first guide tile can be generated using first restoration parameters and a second guide tile can be generated using second restoration parameters. Less desirably, but still possibly, the process 600 can use different techniques for generating guide tiles for a degraded tile.

In an example herein, a guided tile can be generated using a technique described in Kaiming He. Jian Sun, and Xiaoou Tang, Guided image filtering, in *Computer Vision—ECCV* 2010, Springer Berlin Heidelberg 2010, pp. 1-14, which is incorporated herein in its entirety by reference.

Figure 7:
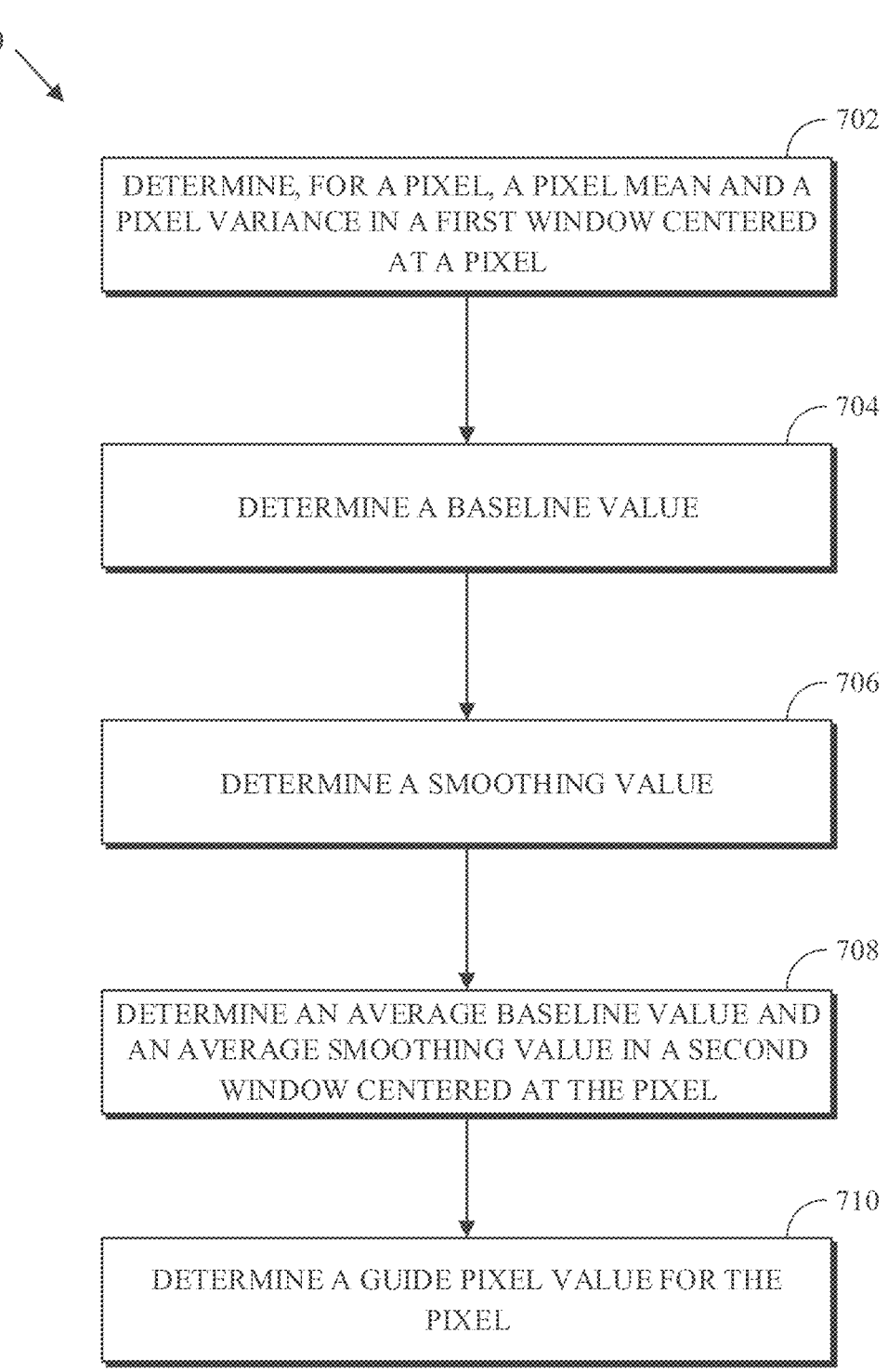
FIG. 7 is a flowchart diagram of a process for generating a guide tile for a degraded tile according to an implementation of this disclosure.

FIG. 7 is a flowchart diagram of a process 700 for generating a guide tile for a degraded tile according to an implementation of this disclosure. The process 700 can be used at 602 of the process 600 to generate a guide tile for a degraded tile. The process 700 can be performed for pixels of a degraded tile. In an example, the process 700 can be performed for each pixel of the degraded tile. Inputs to the process 700 can include restoration parameters radius r and noise e, which are positive values and are further described below. Alternatively, the process 700 can select a radius and a noise value. In an example, the radius and noise value can be selected from a codebook (i.e., a codebook of radii and noise values).

Figures 8, 9A, 9B:
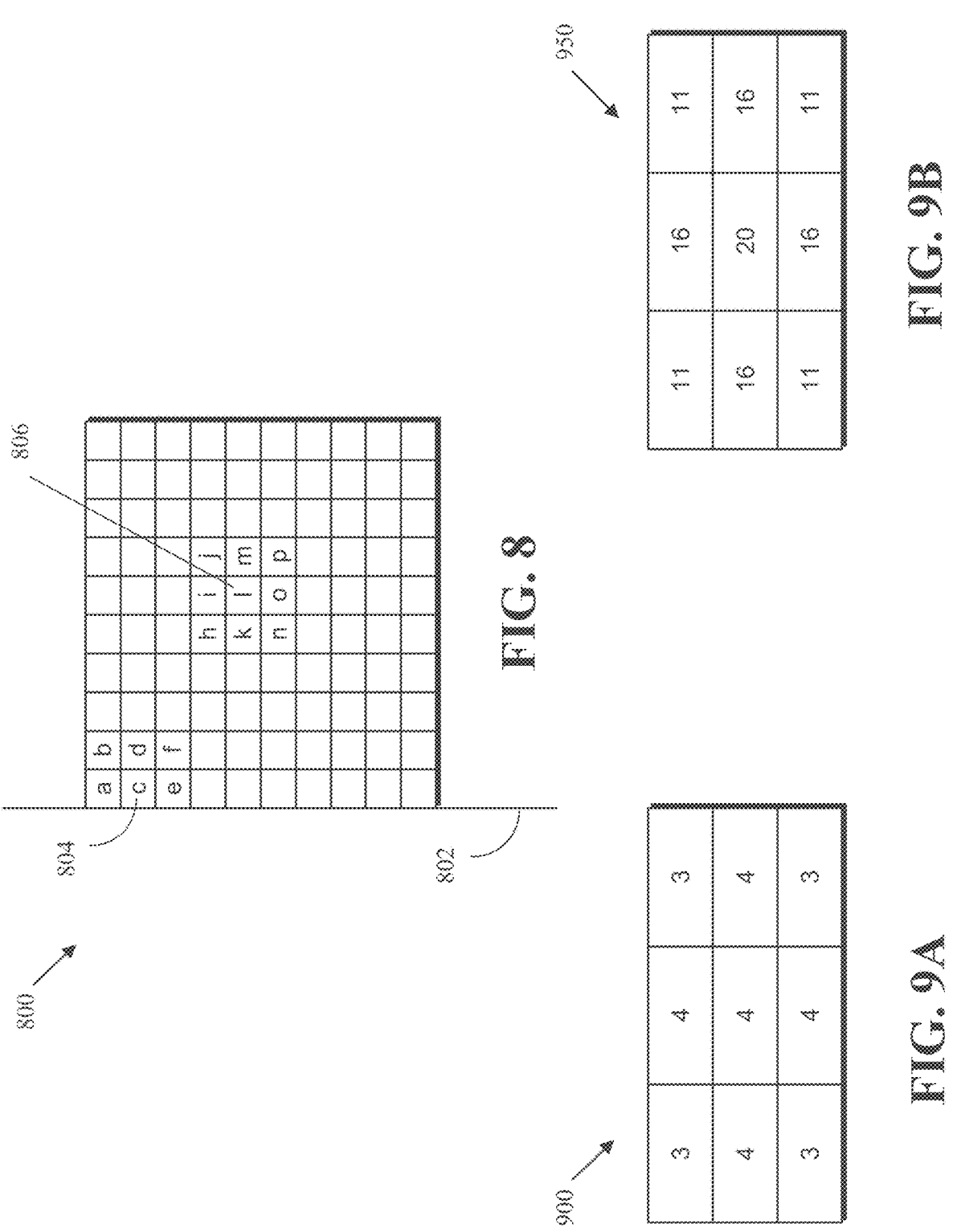
FIG. 8 is an illustration of 3×3 pixel windows according to implementations of this disclosure.
FIGS. 9A and 9B are illustrations of examples of weights assigned to locations of 3×3 windows according to implementations of this disclosure.

At 702, the mean μ (i.e., pixel mean) and variance σ (i.e., pixel variance) in a window of pixels with the radius r around a pixel are determined. The window (i.e., a first window) with a radius of r around a pixel is the set of pixel values in a (2r+1)(2r+1) window centered at, and including, the pixel. For example, if the radius r=1, then the window is the 3×3 set of pixels centered at the pixel; if the radius r=2, then the window is the 5×5 set of pixels centered at the pixel. For pixels on the edges of the tile such that the window around the pixel would include pixels from outside the title, the mean μ and variance σ² determination can be adjusted such that only the values of pixels within the tile are included in the determination of the mean μ and variance σ². Reference is now made to FIG. 8 for an illustration.

FIG. 8 is an illustration of 3×3 pixel windows according to implementations of this disclosure. A line 802 is an edge of a tile 800. For a radius r=1, when calculating the mean μ and variance σ² for a pixel 804, only the values a-f are considered. On the other hand, as the pixels h-p of the 3×3 window of a pixel 806 are all inside the tile 800, then all of the h-p pixel values are used in calculating the mean μ and variance σ² of the pixel 806. In an implementation, the mean μ and variance σ² can be computed using a box filter, which is a technique for computing the mean and variance of pixels in a window of arbitrary size.

At 704, a baseline value f is determined for the pixel. The baseline value is determined using the pixel variance and the noise value. The baseline value f is calculated using equation (1):

$$f = \sigma^2/(\sigma^2 + e) \tag{1}$$

As can be seen, the baseline value f is a value smaller than 1. When the variance σ² is large, the baseline value f approaches 1. That is, when the variance σ² is high in the window around the pixel, then the baseline value f approaches 1. A high variance can indicate the existence of an edge at or close to the pixel. If, on the other hand, the variance σ² is small, then the baseline value f approaches 0. The noise value e can be used as a thresholding value: The noise value e can determine how fast the baseline value f decays or increases.

At 706, a smoothing value g is determined for the pixel. The smoothing value g can be determined using the pixel mean μ and the baseline value f. The smoothing value g can be calculated using equation (2):

$$g = (1 - f) \tag{2}$$

As can be seen, when the variance σ² is large and the baseline value f is close to 1, the smoothing value g approaches 0. When the variance σ² is small and the baseline value f is close to 0, the smoothing value g approaches the mean μ. The impact of the smoothing value g is illustrated below with respect to 710.

At 708, an average baseline value $f_{av}$ and an average smoothing value $g_{av}$ for the pixel are determined. That is, the average of the various baseline values f and the smoothing values g, referred to as the average baseline value $f_{av}$ and the average smoothing value $g_{av}$, respectively, are calculated at 708 using pixel values of the first degraded tile in a second window surrounding the pixel location. The average baseline value $f_{av}$ and the average smoothing value $g_{av}$ can be calculated based on the baseline values f and the smoothing values g of the pixel values encompassed by the same size window (i.e., (2r+1) (2r+1) window) used to calculate the baseline value f and the smoothing value g for the pixel. That is, the first window can have the same size as the second window. However, better results may be obtained when the average baseline value $f_{av}$ and the average smoothing value $g_{av}$ for a pixel are calculated using a 3×3 window regardless of the value of the radius r used in 702.

In order to eliminate division operations in calculating the average baseline value $f_{av}$ and the average smoothing value $g_{av}$, the average baseline value $f_{av}$ and the average smoothing value $g_{av}$ can be approximated using weighted sum of values in the window used in the calculations of $f_{av}$ and $g_{av}$ (e.g., the (2r+1) (2r+1) window or the 3×3 window, as the case may be). In general, for example, the weighting can be the highest for the values of the current pixel location, and be reduced for pixel locations as they extend away from the current pixel location.

FIGS. 9A and 9B are illustrations of examples of weights 900 and 950 assigned to locations of 3×3 windows according to implementations of this disclosure. FIG. 9A illustrates an example of weights 900 assigned to a 3×3 window. In this example, the four corner values are each assigned a weight of 3, and the other five values of the window are each assigned a weight of 4. As such, the total of the weights 900 is 32 (equal to 3\*4+4\*5), which is equivalent to 25. Assuming the window centered at 806 is considered, then the average baseline value $f_{av}$ (and similarly for the average smoothing value $g_{av}$) can be calculated as $(3h+4i+3j+4k+4l+4m+3n+4o+3p)>>5$ (where >> is a right bit-shift operator).

FIG. 9B illustrates another example of weights 950 assigned to a 3×3 window. A weight of 20 is assigned to the center location, a weight of 11 is assigned to each of the corners of the 3×3 window, and a weight of 16 is assigned to the other locations. The sum of the weights 950 is 128 (equal to $2^7$); thus, a right bit-shift operation by 7 can be applied to the weighted sum.

Returning to FIG. 7, a guide pixel value z for the current pixel location in the guide tile is determined at 710. The guide pixel value z can be calculated using formula (3), where x is the co-located pixel value (i.e., the value of the pixel in the degraded tile that is at the same position as the location of the current pixel):

$$z = x \cdot f_{av} + g_{av} \qquad (3)$$

A smoothing value g that approaches the mean $\mu$ indicates that the guide pixel value z will be close to the mean $\mu$. As such, if the smoothing value g approaches the mean $\mu$, and the baseline value f approaches 0, then the degraded pixel value x is weighted less and the guide pixel value z is closer to the average smoothing value $g_{av}$ of the pixel window around the current pixel location. That is, a smoothing effect is applied to the degraded pixel x. On the other hand, when the baseline value f is close to 1, indicating a pixel close to an edge, then the smoothing value g is small. As such, less smoothing and filtering is applied to the degraded pixel value x and the guide pixel value z receives most of its value from the degraded pixel value x and less from the values of its surrounding pixels. The average smoothing value $g_{av}$ can be considered an edge-dependence value. In an implementation, x can be the value of the pixel in the source tile that is at the same position as the location of the current pixel. In such an implementation, x would be referred to as the original pixel value x and all other aspects of the disclosure herein can remain the same.

Returning to the process 600 of FIG. 6, a projection parameter for a projection operation that relates tile differences, also called a subspace projection, is determined at

604. For example, the projection operation can project a difference between a source tile of the source frame and the degraded tile into a subspace generated by a difference between the guide tile and the degraded tile. For purposes of the explanation herein, processing at 604 is described with reference to two guide tiles, a guide tile $Y_1$ and a guide tile $Y_2$. For example, the guide tile $Y_1$ can be generated as described above in the process 700 using a radius $r_1$ and a noise $e_1$ as restoration parameters, and the guide tile $Y_2$ can be generated as described above in the process 700 using a radius $r_2$ and a noise $e_2$ as restoration parameters. As such, the projection operation relates (e.g., approximates) differences between a source tile of the source frame and the first degraded tile to differences between the first guide tile and the first degraded tile and the differences between the source tile of the source frame and the first degraded tile to differences between the second guide tile and the first degraded tile. However, one, two, or more guide tiles $Y_n$ can be used. Using the projection parameter(s), the projection operation can be used to generate a reconstructed tile $Y_R$. The projection operation can be performed using equation (4):

$$Y_R = Y + \alpha(Y_1 - Y) + \beta(Y_2 - Y), \qquad (4)$$

where $\alpha$ and $\beta$ are projection parameters.

Subtracting values of the degraded tile Y from both sides shows that the vector $(Y_R - Y)$ is a linear combination of the vectors $(Y_1 - Y)$ and $(Y_2 - Y)$. As such, the projection operation includes respective difference terms where each difference term uses a respective guide tile (in equation (4), these are guide tile $Y_1$ and guide tile $Y_2$), and the projection parameter includes a respective different projection parameter for each respective difference term (in equation (4), a first projection parameter $\alpha$ corresponding to the difference term $(Y_1 - Y)$, and a second projection parameter $\beta$ corresponding to the difference term $(Y_2 - Y)$). Desirably, the reconstructed tile $Y_R$ has pixel values equal, or relatively close, to the pixel values of collocated pixels of the source tile $Y_S$. Even when each of the vectors $(Y_1 - Y)$ and $(Y_2 - Y)$ separately may not be close to the source tile $Y_S$, the subspace generated by the vectors $(Y_1 - Y)$ and $(Y_2 - Y)$, at the closest point, may be substantially closer than either of them separately. Solving the equation (4) for the projection parameters $\alpha$ and $\beta$ results in the following equation (5):

$$\{\alpha, \beta\}^T = (A^T A)^{-1} A^T b \qquad (5)$$

In equation (5), $A = \{(Y_1 - Y), [(Y)]_2 - Y)\}$ and $b = Y_S - Y$. In this example, each of $Y_1$, $Y_2$, Y, and $Y_S$ is assumed to be a column vector that includes pixels from the respective tile.

The processing at 604 can be repeated for different values (or combination of values) for the radius r and the noise e for the restoration parameters to determine which combination of values results in the least error between the reconstructed tile $Y_R$ and the source tile $Y_S$. The least error can be a mean square error between pixel values of the respective tiles. The least error can be a sum of absolute differences error between pixel values of the respective tiles. Any other suitable least error measure can be used. The different values for the restoration parameters to be used at 604 can be selected from a codebook. For example, the codebook can be a codebook of combinations of radii and noise values $\{r_1, r_2, e_1, e_2\}$. The codebook can be derived empirically.

At 606, the restoration parameters and the projection parameter determined at 604 are encoded in the bitstream. In the above example, the restoration parameters are $r_1$, $r_2$, $e_1$, and $e_2$. The restoration parameters can be encoded into the bitstream for communication in the bitstream to a decoder, such as the decoder 500 of FIG. 5. Alternatively, where a codebook is used, the selected codebook entry $\{_r1, r_2, e_1, e_2\}$ can instead be encoded into the bitstream by an index that represents the selected codebook entry. As such, encoding the first restoration parameters can mean encoding a codebook index. The decoder, which also has the codebook, can use the index to identify the restoration parameters. For example, if the codebook contains 8 entries, then 3 bits may be required to encode the selected index entry. In the case where the codebook is not known to the decoder, other means of encoding at least some of the selected restoration parameters can be used.

The projection parameters $\alpha$ and $\beta$ corresponding to the selected projection parameters at 604 are also communicated in the bitstream. As the projection parameters $\alpha$ and $\beta$ can be double precision values, quantization of the values can occur before they are included in the bitstream. The quantization scheme allocated to the projection parameters $\alpha$ and $\beta$ can depend on the number of bits available in the encoded bitstream for the projection parameters $\alpha$ and $\beta$. When high precision is required for the projection parameters, seven bits can, for example, be used to transmit each of $\alpha$ and $\beta$.

When the process 600 is performed in whole or in part by the loop filtering stage 416 of the encoder 400, a reconstructed image, formed from reconstructed tiles (in the case where multiple tiles are used for the degraded image) can be used for predicting subsequent frames.

When the degraded frame is formed of multiple degraded tiles, each degraded tile of the multiple degraded tiles can be restored based on a different restoration type. That is, the filtering and subspace projection described above can also be referred to as a self-guided filter restoration type. Other possible restoration types can be based on a Wiener filter or a bilateral filter. When multiple restoration types are available, the restoration type for the current tile can also be encoded into the bitstream at 606.

The parameters, and optionally the restoration type, can be encoded into a frame header, a slice header, a block header, or combinations of these headers. The identification of the tiles used in the reconstruction process can also be transmitted within the bitstream. Alternatively, parameters used for the partitioning can be transmitted within the bitstream so that a decoder, such as the decoder 500, can recreate the tiles during the decoding process.

Figure 10:
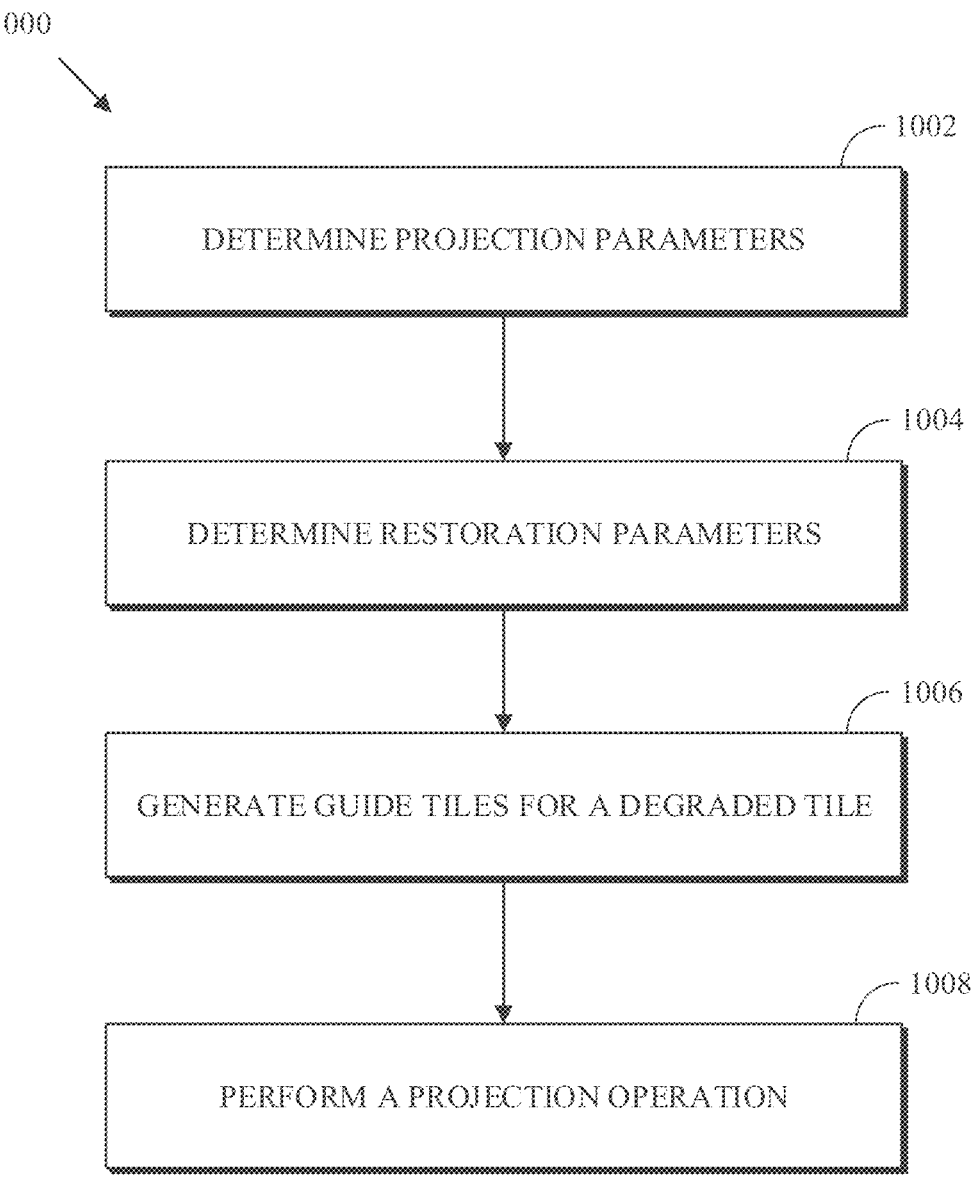
FIG. 10 is a flowchart diagram of a process for restoring a degraded frame at a decoder according to an implementation of this disclosure.

A decoder uses the restoration and projection parameters (and the restoration type, when available), to obtain a reconstructed tile as described with respect to FIG. 10.

FIG. 10 is a flowchart diagram of a process 1000 for restoring a degraded frame at a decoder according to an implementation of this disclosure. The process 1000 can be performed by a decoder such as the decoder 500. For example, the process 1000 can be performed in whole or in part by loop filter stage 512 of the decoder 500. Implementations of the process 1000 can be performed by storing instructions in a memory such as the memory 204 of the receiving station 106 to be executed by a processor such as CPU 202, for example.

The process 1000 can be implemented using specialized hardware or firmware. Some computing devices can have multiple memories, multiple processors, or both. The steps or operations of the process 1000 can be distributed using different processors, memories, or both. For simplicity of explanation, the process 1000 is depicted and described as a series of steps or operations. However, the teachings in accordance with this disclosure can occur in various orders and/or concurrently. Additionally, steps in accordance with this disclosure can occur with other steps not presented and described herein. Furthermore, not all illustrated steps or operations can be used to implement a method in accordance with the disclosed subject matter.

The process 1000 occurs either in whole or in part after the decoder generates a degraded tile of a source frame. The degraded tile can be, for example, all or a portion of a reconstructed frame from a reconstruction loop of the decoder. Again, this frame is referred to as a degraded frame so as to distinguish it from the final reconstructed frame after filtering. For example, all or a portion of the degraded frame could be received from the reconstruction stage 510 at the deblocking filtering stage 514 of the decoder 500. The decoder 500 can be arranged such that the deblocking filtering stage 514 is before the loop filter stage 512. Alternatively, another filter stage can be located after the deblocking filter stage 514. The degraded frame from the reconstruction stage 510 can be deblocked before the process 1000 occurs.

At 1002, projection parameters are determined from the encoded bitstream. For example, in the case where two guide tiles are to be used in the projection operation, the process 1000 can decode a first projection parameter (e.g., a projection parameter $\alpha$) and a second projection parameter (e.g., a projection parameter $\beta$) from the encoded bitstream. The projection parameters can be determined by decoding them from the header in which they were inserted by an encoder. Parameters, such as the projection parameters, are inserted in headers as described above with respect to FIG. 6.

At 1004, restoration parameters are determined from the received encoded bitstream. For example, in the case where two guide tiles are to be used in the projection operation, the process 1000 can determine first restoration parameters (e.g., a radius $r_1$ and a noise $e_1$) and second restoration parameters (e.g., a radius $r_2$ and a noise $e_2$). In an example where the restoration parameters are encoded into the bitstream, they can be determined by decoding them from the header in which they were inserted by an encoder. In an example where a codebook is used to produce and index for inclusion in the bitstream, the index is decoded from the header in which it was inserted by the encoder. The decoded index can be used to determine the restoration parameters that correspond to the entry identified by the index.

At 1006, guide tiles for the current degraded tile are generated. For example, in the case where two guide tiles are to be used in the projection operation, a first guide tile for a degraded tile is generated using the first restoration parameters, and a second guide tile for the degraded tile is generated using the second restoration parameters. The first guide tile and the second guide tile can be generated in accordance with the process 700 of FIG. 7 using the current degraded tile.

At 1008, a projection operation is performed to generate a reconstructed tile of a degraded tile. In the case where two guide tiles are used in the projection operation, the projection operation is performed using the first guide tile, the second guide tile, the first restoration parameters, and the second restoration parameters. For example, the projection operation can be performed using the equation (4). The projection operation includes a first term relating differences between a source tile of the source frame and the degraded tile to differences between the first guide tile and the degraded tile using the first restoration parameters, and a second term relating the differences between the source tile of the source frame and the degraded tile to differences between the second guide tile and the degraded tile using the second restoration parameters.

The process 1000 of FIG. 10 can be repeated as needed, i.e., if the degraded frame constitutes more than one tile, until the reconstructed frame is completed for inclusion as part of the output video stream, such as the output video stream 516 of FIG. 5.

If different restoration types are used for the frame, the restoration type for the tile can be decoded from header in which it was encoded. The process 1000 occurs if restoration type is the self-guided filter restoration type. If another restoration type is used, the appropriate filter (e.g., a Wiener filter or a bilateral filter) can instead be used in the reconstruction process.

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and β, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a general purpose computer or general purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 can also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor (that is, the computer-readable mediu mcan be a non-transitory computer-readable storage medium). The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A non-transitory computer-readable storage medium having stored thereon an encoded bitstream configured to be decoded by a processor, wherein the encoded bitstream comprises:

at least one first data element indicative of first restoration parameters for generating a first guide frame $Y_1$ for a degraded frame Y and second restoration parameters for generating a second guide frame $Y_2$ for the degraded frame Y, wherein the first restoration parameters include a first radius value $r_1$ and a first noise value $e_1$, and the second restoration parameters include a second radius value $r_2$ and a second noise value $e_2$; and at least one second data element indicative of a first projection parameter $\alpha$ and a second projection parameter $\beta$, wherein the first projection parameter a and the second projection parameter $\beta$ used in a projection operation to restore the degraded frame Y, wherein the projection operation is based on $\alpha(Y1-Y)+\beta(Y2-Y)$ to generate a reconstructed frame $Y_R$, wherein the first guide frame $Y_1$ is generated by calculating, for each pixel of the degraded frame Y, a mean and a variance in a window of size $(2*r1+1)\times(2*r1+1)$ centered at the pixel, and wherein the mean, the variance, and the first noise value $e_1$ used to determine a guide pixel.

2. The non-transitory computer-readable storage medium of claim 1, wherein the encoded bitstream is configured for decoding by operations comprising:

decoding the first data element to obtain the first restoration parameters and the second restoration parameters;

decoding the second data element to obtain the first projection parameter $\alpha$ and the second projection parameter $\beta$; and performing the projection operation using the first guide frame $Y_1$, the second guide frame $Y_2$, and the first projection parameter $\alpha$ and the second projection parameter $\beta$ to generate the reconstructed frame $Y_R$.

3. The non-transitory computer-readable storage medium of claim 1, wherein the first data element and the second data element are included in a frame header of the encoded bitstream.

4. The non-transitory computer-readable storage medium of claim 1, wherein the encoded bitstream is configured for decoding by operations comprising:

dequantizing quantized transform coefficients decoded from the encoded bitstream to produce a residual;

reconstructing the degraded frame Y by adding a prediction to the residual; and restoring the degraded frame Y using the projection operation to generate the reconstructed frame $Y_R$.

5. The non-transitory computer-readable storage medium of claim 1, wherein the encoded bitstream further comprises a restoration type, and the projection operation is performed based on a determination that the restoration type specifies a self-guided filter restoration type.

6. The non-transitory computer-readable storage medium of claim 1, wherein the degraded frame Y is a reconstructed frame from a reconstruction loop of a decoder, and the reconstructed frame $Y_R$ is output after applying the projection operation.

7. A non-transitory computer-readable storage medium having stored thereon an encoded bitstream encoded by a processor, wherein the encoded bitstream comprises:

an index into a codebook containing sets of restoration parameters, the index corresponding to first restoration parameters for generating a first guide frame Y1 and second restoration parameters for generating a second guide frame Y2 for a degraded frame Y, wherein the first restoration parameters include a first radius value $r_1$ and a first noise value $e_1$, and the second restoration parameters include a second radius value $r_2$ and a second noise value $e_2$; and a first projection parameter $\alpha$ and a second projection parameter $\beta$ for use in a projection operation to generate a reconstructed frame YR, wherein the projection operation is based on $\alpha(Y1-Y)+\beta(Y2-Y)$, wherein the encoded bitstream is configured for decoding by operations that include restoring the degraded frame Y using the first guide frame Y1, the second guide frame Y2, and the projection operation, wherein the first guide frame $Y_1$ is generated by calculating, for each pixel of the degraded frame Y, a mean and a variance in a window of size $(2r1+1)\times(2r1+1)$ centered at the pixel, and wherein the mean, the variance, and the first noise value $e_1$ used to determine a guide pixel.

8. The non-transitory computer-readable storage medium of claim 7, wherein the operations further comprise:

decoding the index from the encoded bitstream to identify the first restoration parameters and the second restoration parameters from the codebook; and decoding the first projection parameter a and the second projection parameter $\beta$ from the encoded bitstream for use in the projection operation.

9. The non-transitory computer-readable storage medium of claim 7, wherein the index and the first and second projection parameters $\alpha$ and $\beta$ are included in a frame header of the encoded bitstream.

10. The non-transitory computer-readable storage medium of claim 7, wherein the operations comprise:

applying the projection operation to the degraded frame Y using the first guide frame $Y_1$, the second guide frame $Y_2$, and the first and second projection parameters $\alpha$ and $\beta$ to generate the reconstructed frame $Y_R$.

11. The non-transitory computer-readable storage medium of claim 7, wherein the encoded bitstream further comprises a restoration type, and the operations perform the projection operation based on a determination that the restoration type specifies a self-guided filter restoration type.

12. The non-transitory computer-readable storage medium of claim 7, wherein the first projection parameter a and the second projection parameter $\beta$ are quantized values, and the operations further comprise:

dequantizing the quantized values using a quantization scheme based on a number of bits allocated in the encoded bitstream.

13. The non-transitory computer-readable storage medium of claim 7, wherein the codebook is stored at a decoder, and the operations comprise:

using the index to select the first restoration parameters and the second restoration parameters from the codebook.

14. A non-transitory computer-readable storage medium having stored thereon an encoded bitstream configured for decoding by a processor, wherein the encoded bitstream comprises:

a frame header including data elements for decoding:

a first projection parameter a and a second projection parameter $\beta$, wherein the first projection parameter a and the second projection parameter $\beta$ used in a projection operation based on a $(Y_1-Y)+\beta(Y_2-Y)$ to restore a degraded frame Y, where $Y_1$ is a first guide frame generated using first restoration parameters, and where $Y_2$ is a second guide frame generated using second restoration parameters, wherein the first restoration parameters include a first radius value $r_1$ and a first noise value $e_1$, and the second restoration parameters include a second radius value $r_2$ and a second noise value $e_2$, and wherein the data elements in the frame header directly encode the first radius value r1, the first noise value $e_1$, the second radius value $r_2$, and the second noise value $e_2$;

the first restoration parameters and the second restoration parameters for generating the first guide frame and the second guide frame, respectively, the first guide frame $Y_1$ generated by calculating, for each pixel of the degraded frame Y, a mean and a variance in a window of size $(2r1+1)\times(2r1+1)$ centered at the pixel, and the mean, the variance, and the first noise value $e_1$ used to determine a guide pixel.

15. The non-transitory computer-readable storage medium of claim 14, wherein the encoded bitstream is configured for decoding by operations comprising:

decoding the data elements from the frame header to obtain the first projection parameter $\alpha$, the second projection parameter $\beta$, the first restoration parameters, and the second restoration parameters; and performing the projection operation using the first guide frame, the second guide frame, and the first projection parameter $\alpha$ and the second projection parameter $\beta$ to generate a reconstructed frame $Y_R$.

* * * * *